United States Patent [19]

Bürk et al.

[11] Patent Number: 4,873,640

[45] Date of Patent: Oct. 10, 1989

[54] DRIVING-SPEED ADJUSTING ARRANGEMENT

[75] Inventors: Peter Bürk, Reuchen-Ulm; Klaus Hahn, Bühlertal, both of Fed. Rep. of Germany

[73] Assignee: Robert Bosch GmbH, Stuttgart, Fed. Rep. of Germany

[21] Appl. No.: 143,130

[22] PCT Filed: Jan. 15, 1987

[86] PCT No.: PCT/DE87/00018

§ 371 Date: Dec. 21, 1987

§ 102(e) Date: Dec. 21, 1987

[87] PCT Pub. No.: WO87/06200

PCT Pub. Date: Oct. 22, 1987

[30] Foreign Application Priority Data

Apr. 19, 1986 [DE] Fed. Rep. of Germany ....... 3613322

[51] Int. Cl.$^4$ ............................................. B60K 31/00
[52] U.S. Cl. ................................ 364/426.04; 123/352; 180/179
[58] Field of Search ...................... 364/426.04, 424.05; 123/352; 180/170, 174, 176, 179

[56] References Cited

U.S. PATENT DOCUMENTS

| 4,510,899 | 4/1985 | Macy ................................. 123/352 |
| 4,606,425 | 8/1986 | Hayashi et al. ................... 123/352 |
| 4,737,913 | 4/1988 | Blee et al. ..................... 364/426.04 |

Primary Examiner—Gary Chin
Attorney, Agent, or Firm—Walter Ottesen

[57] ABSTRACT

The utilization of the driving-speed adjusting arrangement (10) of a vehicle equipped with a driving-speed control unit as a control element for other functions is suggested. For safety reasons, the driving-speed control unit can only be taken into operation above a specific minimal speed. If the vehicle speed is below this threshold value, then switching contacts (11, 12) of the adjusting arrangement (10) are freely available. When the vehicle is stationary and with driving speeds below a second driving-speed threshold, the switch contacts (11, 12) of the adjusting arrangement (10) are applied for inputting desired values or for directly controlling switching functions. A definitive application of the adjusting arrangement (10) either to an appropriate application or for controlling other functions is made possible by means of the dead zone beneath the first and above the second driving-speed threshold in which the adjusting arrangement (10) is switched without function. In an embodiment, the adjustment to be controlled by the driver of the no-load speed of the internal combustion engine of the vehicle is described.

12 Claims, 1 Drawing Sheet

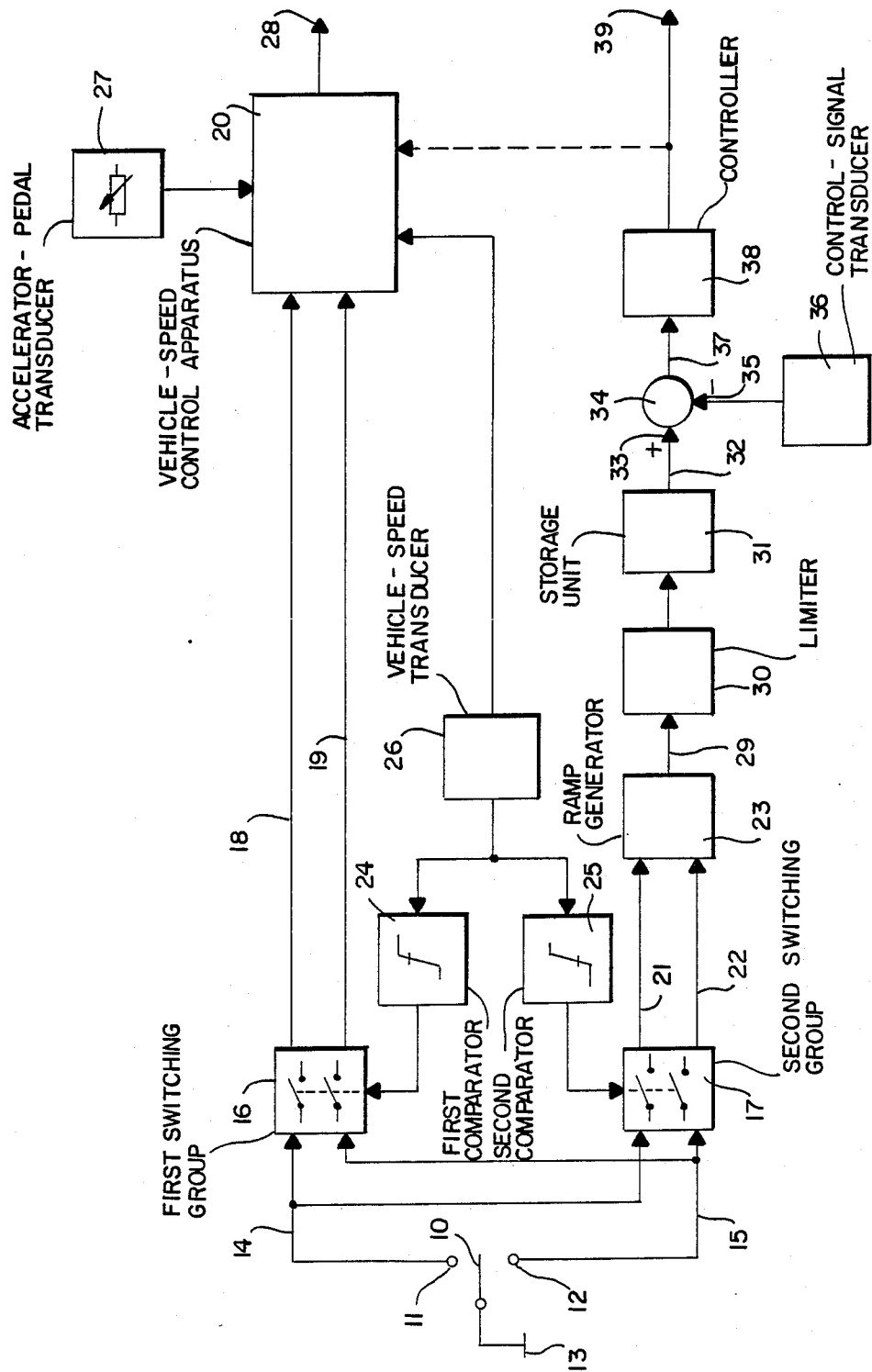

DRIVING-SPEED ADJUSTING ARRANGEMENT

BACKGROUND OF THE INVENTION

The invention starts out from a vehicle-speed adjusting arrangement for motor vehicles. This adjusting arrangement functions in combination with a driving-speed control unit for providing the desired value of the driving speed. The adjusting arrangement has at least two switching contacts wherein the driving speed is increased when one of the contacts is closed and the driving speed is reduced when the other contact is closed. The adjusting arrangement can have further switching contacts which, for example, can be utilized for switching in or switching out the driving-speed control unit or for retrieving a desired speed previously stored. Since driving-speed control units automatically cease to function below a minimal speed, for example at 40 km/h, for reasons of safety, the switching contacts of the driving-speed adjusting arrangement are freely accessible below the minimal speed and can be utilized for serving other functions.

SUMMARY OF THE INVENTION

The inventive use of the driving-speed adjusting arrangement below the minimum speed as an operating element for other functions affords the advantage that input elements such as switches or potentiometers can be dispensed with. An application in a motor vehicle having a combustion engine comprises the presetting of the desired value of the no-load speed of the engine. Especially with respect to commercial vehicles, there is the desire also to provide the driver with a possibility of adjusting the no-load speed in addition to the automatic no-load speed control. In this way, the driver can, for example, accelerate the use of the heating operation after the start or, when the mechanical no-load control unit malfunctions, the driver can control an emergency operation. Furthermore, a use of the switching contacts of the driving-speed adjustment arrangement for electrically displacing the rearview mirror or the driver's seat is possible, since these adjustments preferably take place when the vehicle is stationary. A further application possibility is the presetting of a rotational speed limit of the drive engine as well as of a highest speed To prevent erroneous operations, it is especially advantageous to provide a dead zone in which the driving-speed adjusting arrangement ceases to function. The contacts of the adjusting lever are separated from the additional electrical equipment beneath a first threshold of the driving speed which corresponds to the minimum speed in the controlled operation and above a second threshold of the driving speed. The two threshold values are permanently set and lie, for example, at 40 km/h and 20 km/h. Above the first threshold, the driving-speed adjusting arrangement operates exclusively on the driving speed regulating unit. Beneath the second threshold, analog or digitally operating circuit equipment is controlled with the switching contacts. In the simplest case, the on-off function of the switching contacts is used to directly switch on and off electrical units such as electrical motors.

A controllable ramp generator is suitable for changing an analog desired value by means of electrical switching contacts. In the neutral position of the driving-speed adjusting arrangement, the output signal of the ramp generator remains at a constant value. When one or the other of the switching contacts is actuated, the output signal drops or rises until the driving-speed adjusting arrangement is again brought into the neutral position. Exceeding or dropping below permissable desired values by too long an actuation of the adjusting arrangement prevents a limit switching. The adjusted desired value is useable for example as a control signal or as a command signal of control circuit.

Digital circuits can be advantageously driven with the switching contacts of the adjusting arrangement. An up-down counter which is appropriately driven can be used for the digital desired-value presetting. As is the case with analog circuits, a limit of the adjustable values is purposeful also with the digital circuits. The digital desired value can be directly used further, for example, as a command signal of a digital regulator; however, a translation into an analog value by means of a digital-analog converter is also possible.

In dependence upon the application, it can be purposeful to store the analog or digital desired value after switching off the vehicle so that it is available after switching on.

Further details of the inventive application of the driving-speed adjusting arrangement are obtained from the following description.

BRIEF DESCRIPTION OF THE DRAWING

The FIGURE shows an embodiment of the inventive application of a driving-speed adjusting arrangement for adjusting a desired value beneath a minimum speed with a signal processing arrangement.

DESCRIPTION OF THE PREFERRED EMBODIMENTS OF THE INVENTION

The FIGURE shows a driving-speed adjusting arrangement 10 having first and second switching contacts 11, 12 which are switchable to ground 13 starting from the neutral position shown in the FIGURE. The adjusting arrangement comprises, for example, a lever 10 which is mounted in the region of the steering wheel or comprises a pushbutton arrangement built into the control panel. The two signal leads 14, 15 which are connected to the contacts 11, 12 are simultaneously connected to a first switching group 16 as well as to a second switching group 17. The two leads 18 and 19 lead away from the first switching group 16 and are connected to a driving-speed control apparatus 20. The two signal leads 21, 22 which lead away from the second switching group 17 are connected to a ramp generator 23. An up-down counter is also useable in lieu of the ramp generator if digital signal processing is to be provided.

The first switching group 16 is driven by the output of a first comparator 24 and the second switching group 17 is driven by the output of a second comparator 25. The two comparators 24, 25 are adjusted to fixed values of the driving speed and receive their input signals from a driving-speed transducer 26, which is also connected with the driving-speed control apparatus 20. The driving speed control apparatus 20 receives a further signal from the accelerator-pedal transducer 27. The output lead 28 of the controller 20 leads to a positioning member which is not discussed further here.

The output 29 of the ramp generator 23 or of the counter leads via a limiter 30 to a storage unit 31 at the output 32 of which a command signal is available. The command signal is applied to the input 33 of a summing device 34. The other input 35 of the summing device 34 receives a control signal from a control-signal transducer 36.

The control deviation at the output 37 of the summing device 34 is applied to the controller 38 at the output 39 of which a positioning signal is available. If required, the output 39 of the controller 38 is connected with the driving-speed control apparatus 20.

The arrangement shown in the FIGURE operates in the following manner. Starting from the neutral position shown, the driving-speed adjusting lever 10 connects either the first contact 11 or the second contact 12 to ground 13. The signal leads 14, 15 leading to both contacts 11, 12 are simultaneously connected to the first switching group 16 as well as also to the second switching group 17. The first switching group 16 simultaneously connects the signal lead 14 with the signal lead 18 and the signal lead 15 with the signal lead 19 or simultaneously interrupts both connections.

The first switching group 16 is driven by the first comparator 24. The first comparator 24 is adjusted to a fixed driving-speed value beneath which the two switches of the first switching group 16 are opened and above which the switches are closed. The threshold lies, for example, at 40 km/h. If the driving speed is above this threshold, then the driving-speed control apparatus 20 is appropriately driven via the driving-speed adjusting lever 10.

A connection of the first switching contact 11 with ground 13 leads, for example, to an increase in the driving speed and a connection of the second switching contact 12 to ground 13 leads to a drop in the driving speed. For carrying out this task, the driving-speed control apparatus 20 receives the actual value of the driving speed from the driving-speed transducer 26. This signal is likewise applied to the first comparator 24.

The driving-speed control apparatus 20 receives at least still one further input signal which is provided by the accelerator-pedal transducer 27. The accelerator-pedal transducer 27 acts alone on the driving-speed control apparatus 20 beneath the first threshold value of the driving speed when both switches of the first switching group are open. Above this first threshold, the accelerator-pedal transducer 27 only has an influence on the control apparatus 20 when the adjusting lever 10 is in the neutral position shown.

The second switching group 17 is driven by a second comparator 25. Both switches of the second switching group 17 are closed below a second threshold of driving speed which can, for example, be at 20 km/h so that the two signal leads 14, 21 are connected with each other and the two signal leads 15, 22 are connected with each other.

The two leads 21, 22 are control leads of the ramp generator 23. The ramp generator 23 provides an increasing signal at its output 29 when the adjusting lever 10, for example, connects the first switching contact 11 to ground 13 and provides a decreasing signal when the adjusting lever 10 connects the second switching contact 12 to ground. The output signal 29 does not change when the adjusting lever 10 is in the neutral position shown. The output signal 29 likewise does not change when the second threshold of the driving speed is exceeded which is preset by the second comparator 25, and as a consequence thereof, the two switches of the second switching group 17 are opened. The analog output signal 29 corresponds, for example, to the desired value which is to be controlled (open loop or closed loop).

A limiter 30 is provided after the ramp generator 23. The limiter 30 limits the upper and/or lower amount of the desired value to permitted values. If the limiter 30 is not provided, then a limitation of the desired value by the ramp generator 23 necessarily takes place which, in a limiting situation, is a function of its output circuitry and the available supply voltage. If the desired value reaches a limit value, for example, by connecting the first switching contact 11 with ground 13, a connection continuing therebeyond has no more influence on the desired value. In this case, a change can result only by means of a connection of the second switching contact 12 with ground 13. If the output signal 29 of the ramp generator 23 is far beyond the values preset by the limiter, then an oppositely directed change of the desired value after the limiter 30 occurs with a certain delay which is dependent upon the amount by which the limit value is reduced at the output 29 of the ramp generator 23.

The adjusting lever 10 no longer operates on the ramp generator 23 when the signal delivered by the driving-speed transducer 26 lies above the threshold preset by the second comparator 25 and the two switches of the second switching group 17 are thereby opened.

If required, it can be purposeful to store the last-adjusted value before switching off the vehicle so that it is immediately available after again switching on. For this purpose, the storage unit 31 is provided which, for example, can be configured as a sample and hold circuit.

The signal at the output 32 of the storage unit 31 can be utilized for control purposes; however, it can also be used as a command signal of a control loop of which the following are shown: the summing device 34 with the two inputs 33, 35; the control-signal transducer 36; and, the actual controller 38. The controller 38 generates a control signal at its output 39 in dependence upon the control deviation occurring at the output 37 of the summing device 34. If the connection shown in the FIGURE of the controller output 39 with the driving-speed control apparatus 20 is present, then the no-load speed of an internal combustion engine can be adjusted with the arrangement shown if the control-signal generator 36 detects the engine speed.

The described analog-signal processing between the second switching group 17 and the summing device 34 can be advantageously replaced by digital-signal processing. It is also here essential that, above the first threshold of the driving speed preset by the first comparator 24, the driving-speed adjusting lever 10 coacts with the driving-speed control apparatus 20 via closure of the two switches contained in the first switching group 16 and, beneath the second threshold of the driving speed preset by the second comparator 25, the adjusting lever 10 is applied for controlling other functions by closure of the two switches contained in the second switching group 17. A speed region lies between the first and second thresholds of the driving speed in which the adjusting lever 10 can be switched without having any function by opening all switches of the first and second switching groups 16, 17.

Beneath the second driving speed threshold, the two signal leads 21, 22 control the up-down counter which takes the place of the ramp generator 23. An upward counting operation takes place as long as the adjusting lever 10, for example, connects the switching contact 11 to ground 13 and a downward counting operation takes place as long as the second switching contact 12 is switched to ground 13. The counter position at the output 29 of the counter 23 corresponds to a desired value which is limited in the following digital limiter 30 to an upper and/or lower.

A storage unit 31 is also provided for the case that the desired value is to be stored after switching off the vehicle. An electrically clearable fixed value memory is here especially suitable as a storage element of the digital desired value which retains its information also after switching off the supply voltage.

A transition from digital to analog signal processing is made possible by a digital-to-analog converter as may be required. As already described, this signal can be applied for the open-loop or closed-loop control of functions.

The arrangement permits a no-load speed control of an internal combustion engine when the connection is present shown between the control output 39 and the driving-speed control apparatus 20 and when the control-signal transducer 36 detect the engine speed.

If the digital components (up-down counter 23, digital limiter 30 and storage unit 31) are realized as a microprocessor circuit, then the summing device 34 and the controller 30 are realized appropriately as a computer program. Retaining the digital-signal processing is then especially advantageous when the circuits (here, for example, the driving-speed control apparatus 20) which follow likewise perform digital signal processing.

In addition to the embodiment shown in the FIGURE, a simpler embodiment of the arrangement is made possible in that the two switching leads 21, 22 directly initiate switching operations beneath the second driving-speed threshold. Adjusting operations which are preferably made when the vehicle is stationary are, for example, the adjustment of the rear view mirror or of the seat. In lieu of a ramp generator or up-down counter 23, a switching stage is then provided for driving electric motors.

A further application of the arrangement according to the invention is the adjustment of limit values such as, for example, the highest speed of the vehicle engine or the adjustment of the maximum driving speed. In this case, the two signal leads 21, 22, in addition to the corresponding limit circuit, also act on the electronic indicating element for the engine speed or the driving speed so that the value to be adjusted can be read directly.

What is claimed is:

1. A vehicle-speed adjusting arrangement comprising:
    a switching unit including: first and second switching contacts for controlling an increase and a decrease in the vehicle-speed desired value, respectively; and, selector switching means movable between two positions for selectively connecting one of said contacts to a neutral position;
    a vehicle-speed control apparatus for controlling the speed of the vehicle in response to the position of said selector switching means;
    transducer means for providing an electrical speed signal indicative of the actual speed of the vehicle;
    first switching means movable between a first condition wherein said switching contacts are disconnected from said control apparatus and a second condition wherein said switching contacts are connected to said control apparatus;
    ancillary function means for performing an ancillary function in the motor vehicle;
    second switching means movable between a first situation wherein at least one of said switching contacts is disconnected from said ancillary function means and a second situation wherein said one switching contact is connected to said ancillary function means;
    comparator means for setting a threshold vehicle speed and being responsive to said speed signal for acutating said first switching means to move the first switching means from said second condition thereof into said first condition when said vehicle speed drops below said threshold vehicle speed and for actuating said second switching means to move the second switching means from said first situation thereof into said second situation thereof also when said vehicle speed drops below said threshold vehicle speed thereby permitting said one switching contact to serve to control said ancillary function means.

2. A vehicle-speed adjusting arrangement comprising:
    a vehicle-speed adjusting and switching unit including: first and second switching contacts for controlling an increase and a decrease in the vehicle-speed desired value, respectively; and, a selector switch movable between two positions for selectively connecting one of said contacts and a neutral position;
    a vehicle-speed control apparatus for controlling the speed of the vehicle in response to the position of said selector switch;
    transducer means for providing an electrical speed signal indicative of the actual speed of the vehicle;
    first switching means movable between a first condition wherein said switching contacts are disconnected from said control apparatus and a second condition wherein said switching contacts are connected to said control apparatus;
    first comparator means for setting a first threshold vehicle speed and being responsive to said speed signal for actuating said first switching means to move the first switching means from said second condition into said first condition when said vehicle speed drops below said first threshold vehicle speed;
    ancillary function means for performing another function in the motor vehicle;
    second switching means movable between a first situation wherein said switching contacts are disconnected from said ancillary function means and a second situation wherein said switching contacts are connected to said ancillary function means; and,
    second comparator means for setting a second threshold vehicle speed and being responsive to said speed signal for actuating said second switching means to move the second switching means from said first situation thereof into said second situation thereof when the vehicle speed drops below said second threshold thereby connecting said two switching contacts to said ancillary function means.

3. The vehicle-speed adjusting arrangement of claim 2, wherein said first and second switching means are actuated by said first and second comparator means to connect said switching contacts of the switching unit with said ancillary function means via a plurality of signal leads.

4. The vehicle-speed adjusting arrangement of claim 2, wherein: below said first driving-speed threshold, signal leads between said switching contacts of the switching unit (10) and said vehicle-speed control apparatus (20) are interrupted by said first switching mean (16) and, above the first threshold, are connected.

5. The vehicle-speed adjusting arrangement of claim 2, wherein: below a second threshold value of the vehicle speed presettable by means of said second comparator means (25), signal leads (14, 15, 21, 22) are connected between the switching contacts (11, 12) of the switching unit (10) and a circuit arrangement (23) of the other function by means of said second switching means (17) and, above the second vehicle-speed threshold, are interrupted.

6. The vehicle-speed adjusting arrangement of claim 2, wherein: the first vehicle-speed threshold is greater than the second vehicle-speed threshold, and that at vehicle speeds between the first and second thresholds, said first switching means is in said first condition thereof and said second switching means is in said first situation thereof thereby interrupting all signal leads (14, 15, 18, 19, 21, 22).

7. The vehicle-speed adjusting arrangement of claim 2, wherein: below the second vehicle-speed threshold, the switching contacts (11, 12) of the switching unit (10) serve to initiate switching functions via the signal leads (14 and 21, 15 and 22) connected with the second switching mean (17).

8. The vehicle-speed adjusting arrangement of claim 2, comprising: a signal generator; and signal leads interconnecting said signal generator and said switching unit via said second switching means to initiate an increase or decrease in the output signal of said signal generator.

9. The vehicle-speed adjusting arrangement of claim 8, wherein: a limiter (30) is connected to follow the signal generator (23) which limits the output signal (29) of the signal generator (23) to a first value.

10. The vehicle-speed adjusting arrangement of claim 8, wherein: the signal leads (21, 22) are control leads of a counter arrangement (23).

11. The vehicle-speed adjusting arrangement of claim 10, wherein: a digital limiter (30) is connected in cascade with the counting arrangement (23), said limiter (30) limiting the count position of the counting arrangement (23) to a first digital value.

12. The vehicle-speed adjusting arrangement of claim 8, comprising a storage arrangement (31); and, said output signal (29) of the signal generator (23) being stored in said storage arrangement (31) after the engine of the vehicle has been shut down.

* * * * *

UNITED STATES PATENT AND TRADEMARK OFFICE
CERTIFICATE OF CORRECTION

PATENT NO. : 4,873,640
DATED : October 10, 1989
INVENTOR(S) : Peter Bürk and Klaus Hahn It is certified that error appears in the above-identified patent and that said Letters Patent is hereby corrected as shown below:

In column 1, line 45: insert a period after "speed".

In column 5, line 4: insert -- value -- between "lower" and the period.

In column 5, line 20: delete "detect" and substitute -- detects -- therefor.

In column 7, line 3: insert -- (14, 15, 18, 19) -- between "leads" and "between".

In column 7, line 3: insert -- (11, 12) -- between "contacts" and "of".

In column 7, line 5: delete "mean" and substitute -- means -- therefor.

In column 8, line 3: delete "mean" and substitute -- means -- therefor.

Signed and Sealed this

Fourth Day of September, 1990

Attest:

HARRY F. MANBECK, JR.

*Attesting Officer*   *Commissioner of Patents and Trademarks*